No. 797,776. PATENTED AUG. 22, 1905.
F. B. MARVIN.
COMPOSITION OF MATTER FOR BUILDING PURPOSES.
APPLICATION FILED JAN. 30, 1905.

WITNESSES:
Wm. D. Bell
Adele Glatt

INVENTOR,
Frederick B. Marvin,
BY
Gartner & Steward,
ATTORNEYS.

FREDERICK B. MARVIN, OF PATERSON, NEW JERSEY.

COMPOSITION OF MATTER FOR BUILDING PURPOSES.

No. 797,776.	Specification of Letters Patent.	Patented Aug. 22, 1905.

Application filed January 30, 1905. Serial No. 243,260.

*To all whom it may concern:*

Be it known that I, FREDERICK B. MARVIN, a citizen of the United States, residing in Paterson, county of Passaic, and State of New Jersey, have invented certain new and useful Improvements in Compositions of Matter for Building Purposes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to concrete and other artificial-stone substances; and it has for its object to provide in place of the usual composition of matter of this nature, in which cinders or broken stone form the "solid" ingredients, a composition in which pieces of refractory material made in conventional forms and cellular constitute the solid elements. The solid ingredient of substances of this nature as heretofore compounded being irregular in size tended to agglomerate itself in masses of the smaller particles, only the larger pieces standing properly dispersed through the substance. This affected materially the homogeneity of the substance and led to unevenness of strength and a lack of the desired elasticity, porosity, &c., in the mass. By providing regularly-sized solid bodies for this purpose I overcome all these disadvantages and besides have a material which is more readily handled and more at the command of the workmen in the matter of their perceiving just what quantity and disposition of solids is needed and attained, and by making said bodies conventional in form and especially of angular form the advantages just mentioned are furthered, and in addition they knit more firmly with the substance with which they are mixed and are capable of being conveniently packed in the loose state for shipping in small space and compact arrangement, and by further forming these bodies cellular the lightness of the mass when they are incorporated therein is increased without detracting from its strength, besides increasing the porosity and the imperviousness to sounds, heat, and cold incident thereto.

My invention will be found fully illustrated in the accompanying drawings, wherein—

Figure 1:
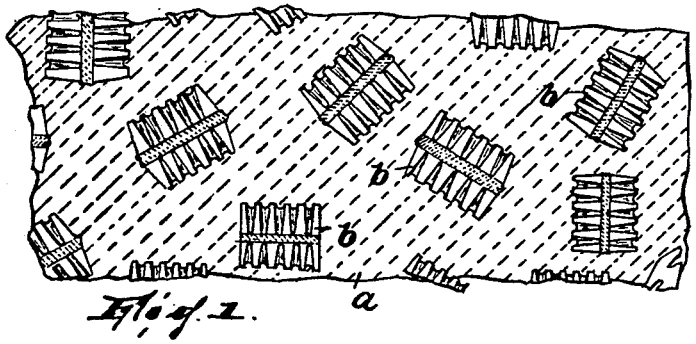
Figure 2:
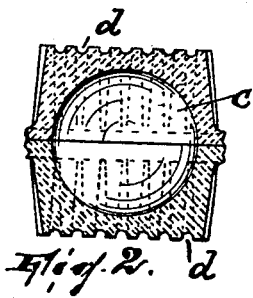
Figure 3:
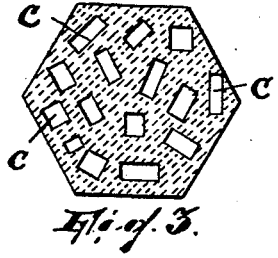

Figure 1 is a sectional view of concrete or the like containing my conventionally-formed and cellular bodies, and Figs. 2 and 3 are sectional views of two different forms of said bodies.

The plastic portion *a* of the concrete may be made up of any suitable materials. In it is mixed while still in the plastic state the blocks shown in Figs. 2 and 3. Said blocks (designated *b* in Fig. 1) may be formed in any suitable manner not necessary to be described in detail herein. In a copending application filed of even date herewith I have indicated how said blocks may be formed. Suffice it to say that the blocks are of approximately the same size and conventional and preferably substantially the same in shape. They are, furthermore, formed with cells *c*. These cells may be either one to a block, as in Fig. 2, in which case they approximate in size the size of the block, or several to a block, as in Fig. 3. The cells may be either entirely closed, or substantially so, the idea being to at least preserve the cellular structure after the blocks are incorporated in the concrete against being filled by the concrete. In order to augment the adhesion or binding between the blocks and the cement the former may be corrugated on the outside, as at *d*, or otherwise formed with an uneven surface.

Having thus fully described my invention, what I claim, and desire to secure by Letters Patent of the United States, is—

1. A composition of matter for building purposes comprising plastic material and blocks of refractory material of conventional form and substantially regular size interspersed in said plastic material, substantially as described.

2. A composition of matter for building purposes comprising plastic material and blocks of refractory material of conventional and angular form and substantially regular size interspersed in said plastic material, substantially as described.

3. A composition of matter for building purposes comprising plastic material and blocks of cellular refractory material of conventional form and substantially regular size interspersed in said plastic material, substantially as described.

4. A composition of matter for building purposes comprising plastic material and blocks of refractory material of conventional form and substantially regular size having their outer surfaces uneven, substantially as described.

5. A composition of matter for building purposes comprising plastic material and blocks of refractory material each having a closed cell approximating in size the size of the block, substantially as described.

In testimony that I claim the foregoing I have hereunto set my hand this 17th day of January, 1905.

FREDERICK B. MARVIN.

Witnesses:
JOHN W. STEWARD,
WM. D. BELL.